United States Patent
Liao (10) Patent No.: US 10,881,979 B2
(45) Date of Patent: Jan. 5, 2021

(54) DEVICE FOR MULTISTAGE CONTINUOUS PREPARATION OF DEUTERIUM DEPLETED WATER

(71) Applicant: NNB Nutrition USA LLC, Lewisville, TX (US)

(72) Inventor: Kylin Liao, Nanjing (CN)

(73) Assignee: NNB Nutrition USA LLC, Lewisville, TX (US)

( * ) Notice: Subject to any disclaimer, the term of this patent is extended or adjusted under 35 U.S.C. 154(b) by 0 days.

(21) Appl. No.: 16/118,428

(22) Filed: Aug. 30, 2018

(65) Prior Publication Data

US 2020/0070062 A1  Mar. 5, 2020

(51) Int. Cl.
  *B01D 3/00* (2006.01)
  *C01B 5/00* (2006.01)
  *B01D 59/04* (2006.01)
  *C02F 1/04* (2006.01)
  *B01D 3/14* (2006.01)

(52) U.S. Cl.
  CPC ............ *B01D 3/007* (2013.01); *B01D 3/143* (2013.01); *B01D 59/04* (2013.01); *C01B 5/00* (2013.01); *C02F 1/041* (2013.01); *C01P 2006/80* (2013.01); *C02F 2301/08* (2013.01); *C02F 2303/10* (2013.01)

(58) Field of Classification Search
  None
  See application file for complete search history.

(56) References Cited

U.S. PATENT DOCUMENTS

| 4,297,172 A * | 10/1981 | Kyle | B01D 3/001 203/19 |
| 2004/0256212 A1* | 12/2004 | Ikeda | B01D 3/14 202/172 |

OTHER PUBLICATIONS

Miller, A, Heavy Water: A Manufacturer's Guide for the Hydrogen Century, 2001, Canadian Nuclear Society Bulletin, vol. 22, No. 1, pp. 1-14. (Year: 2001).*

* cited by examiner

Primary Examiner — Derek N Mueller
(74) Attorney, Agent, or Firm — Anna Tsang (57) ABSTRACT

The present application discloses a device for multistage continuous preparation of deuterium depleted water, which includes a feeding pump, a plurality of stages of separation systems connected in series, and a receiver, all of which are connected in sequence. Each stage of separation system comprises a distillation column, a vapor-liquid separator, a low-pressure steam compressor, a stream delivery pump, a three-way valve, and a stream output pipe. The present application further discloses a method for preparing deuterium depleted water, wherein natural water is fed into the device of the present disclosure, and the liquid phase stream continuously flows backwards stage by stage under the combined action of the low-pressure steam compressors and the stream delivery pumps. In a single-stage system, the deuterium is deprived depending on the difference in vapor pressure between $^1H_2O$ and $^2H_2O$ (and/or $^1H^2HO$), and finally, the deuterium depleted water is produced.

10 Claims, 5 Drawing Sheets

DEVICE FOR MULTISTAGE CONTINUOUS PREPARATION OF DEUTERIUM DEPLETED WATER

BACKGROUND OF THE INVENTION

1. Technical Field

The present invention relates to a device for preparing deuterium depleted water. In particularly, the present invention relates to a device for multistage continuous preparation of deuterium depleted water. The present invention also relates to a method for preparing deuterium depleted water using such a preparation device.

2. Description of Related Art

Deuterium Depleted Water (DDW) also called ultra-light water is water with a low deuterium content, in which the content of deuterium oxide (D2O & DHO) is generally less than 0.013% (i.e., 130 ppm).

Water is composed of two hydrogen atoms and one oxygen atom (H2O). The elemental hydrogen has three isotopes with different mass numbers. Protium ($^1H$) and deuterium ($^2H$ or D) are both stable isotopes with the mass of 1 and 2, respectively. Tritium ($^3H$) with the mass of 3 is a radioactive isotope, which exists in the nature in an extremely low content and can be basically ignored. Natural water mainly contains protium oxide ($^1H2O$) molecules of which the content is 99.985%, and deuterium oxide (D2O & DHO) of which the content is generally 0.015% (i.e., 150+/−5 ppm) as the rest.

Modern science has proved that water is a source for life existence and development, but the elemental deuterium is harmful to the existence, development and reproduction of living entities. Regarding the elemental deuterium and the elemental protium, it is known that HO—$^2H$ and C—$^2H$ bonds are stronger than HO—$^1H$ and C—$^1H$ bonds and are harder to break. The replacement of $^1H$ with $^2H$ will induce additional stress in the helical structure of DNA, leading to phase shift, breakage and substitution of the double helix and resulting in disordered arrangement of the ribonucleic acid and even recombination to cause mutation. Consequently, the probability of cancer in a human body will be increased.

Further, a high content of deuterium can have harmful effects on the heredity, metabolism and enzyme system. The higher the content of the deuterium is, the greater the toxicity to the living entities is, and therefore, various animal and plant living entities including human always suffer from deuterium poisoning at different degrees, although they have had adaption to natural water which has the content of 150 ppm deuterium. Water with a low deuterium content has a plurality of biological effects beneficial to living entities had been proved by deuterium depleted water tests conducted by Hungarian scientist, professor Dr. Gabor, and professor Seki Kunihiro from Department of Biology, Faculty of Science, Kanagawa University of Japan, et al.

DDW is a colorless, odorless, and tasteless liquid. Compared with ordinary water, DDW has reduced density, melting point and boiling point, and also has significant changes in physical and chemical properties such as ionization degree, viscosity, ion mobility.

Scientific research shows that the liquid water in the nature exists in the form of a cluster rather than the form of a single molecule. The size of a water cluster is detected by using 17O NMR. Generally, the water with a 17O NMR spectral line less than 100 Hz is called small cluster water which is highly active and easily permeable into human body cells; large cluster water of 17O NMR spectral line greater than 100 Hz is greatly reduced in molecular activity and is far inferior to the small cluster water in nutritional and physiological functions such as permeability, diffusivity, solubility and the like, not easy to penetrate through human body cell membrane and not easy to be absorbed by human body.

The 17O NMR tested spectral line value of DDW is between 60 and 70. This indicates that DDW is excellent small cluster water which is easy to be absorbed by human body and has high permeability and high diffusivity with negative potentials and weak alkalinity. DDW has a wide range of uses, and can be used for preparing ultrapure protium gas, nuclear magnetic resonance solvents, water for cosmetic and medicine formulations, and water for preventing and treating diseases and health care beverages.

In conclusion, water is a life source. The content of the elemental deuterium ($^2H$) in water is an important standard for measuring the water quality. DDW can be widely applied to scientific research, and can have the functions of activating the immune cells, improving the basic metabolic level of the organism, resisting cell mutation, delaying senescence and the like. Moreover, DDW is beneficial to the existence, development and reproduction of living entities and has important significance for human health.

The process of preparing DDW belongs to the field of isotope separation, which is to separate the elemental protium and the elemental deuterium mixed together. Methods for isotope separation include chemical exchange method, rectification method, an electrolysis method, thermal diffusion method, membrane diffusion adsorption method, centrifugation method, laser method and the like. However, in consideration of the process safety and the industrial production of DDW, a purely physical separation method would be the most appropriate. That is, DDW may be obtained by continuously depriving the heavy fraction $^2H2O$ by virtue of the slight difference in vapor pressure between the $^1H2O$ molecules and the $^1H2O$ molecules in natural water. Such a vapor-liquid mass transfer separation method for natural water has advantages including easily available feedstock, simple and reliable operations, and green and environment-friendly production process, and is an easily implementable method for industrial production of DDW.

However, the isotope rectifying separation technique for natural water still has many problems at present: due to the small separation coefficient and the large number of separation stages for $^1H2O$ and $^2H2O$ isotopes, if no high-efficiency rectifying mass transfer separation unit is properly installed, dozens of and even hundred of rectifying separation units need to be connected in series and in parallel for large-scale production with high investment. The cascading technique of series connection and parallel connection between various stages of rectifying separation units is complicated and balanced stable operations are difficult to achieve. Each stage of rectifying separation unit comprises a reboiler and a condenser. In an existing isotope rectifying mass transfer separation process, each stage of mass transfer rectifying separation consists of a reboiler and a condenser, besides, external steam supply is required to provide a vaporizing heat source for heating the liquid phase stream and an external circulating cooling water system is needed to provide a cold source for cooling the vapor phase stream. Meanwhile, due to the small separation coefficient and the large reflux ratio, an existing device is required to vaporize and cool a large amount of streams with great energy losses. All these problems severely restrict the preparation, marketing and uses of DDW.

BRIEF SUMMARY OF THE INVENTION

A technical problem to be solved by the present invention is to provide a device and method for multistage continuous preparation of deuterium depleted water so as to obtain the deuterium depleted water with high efficiency and low energy consumption.

To solve the above technical problem, the following technical solutions are adopted in the present invention.

Figure 1:
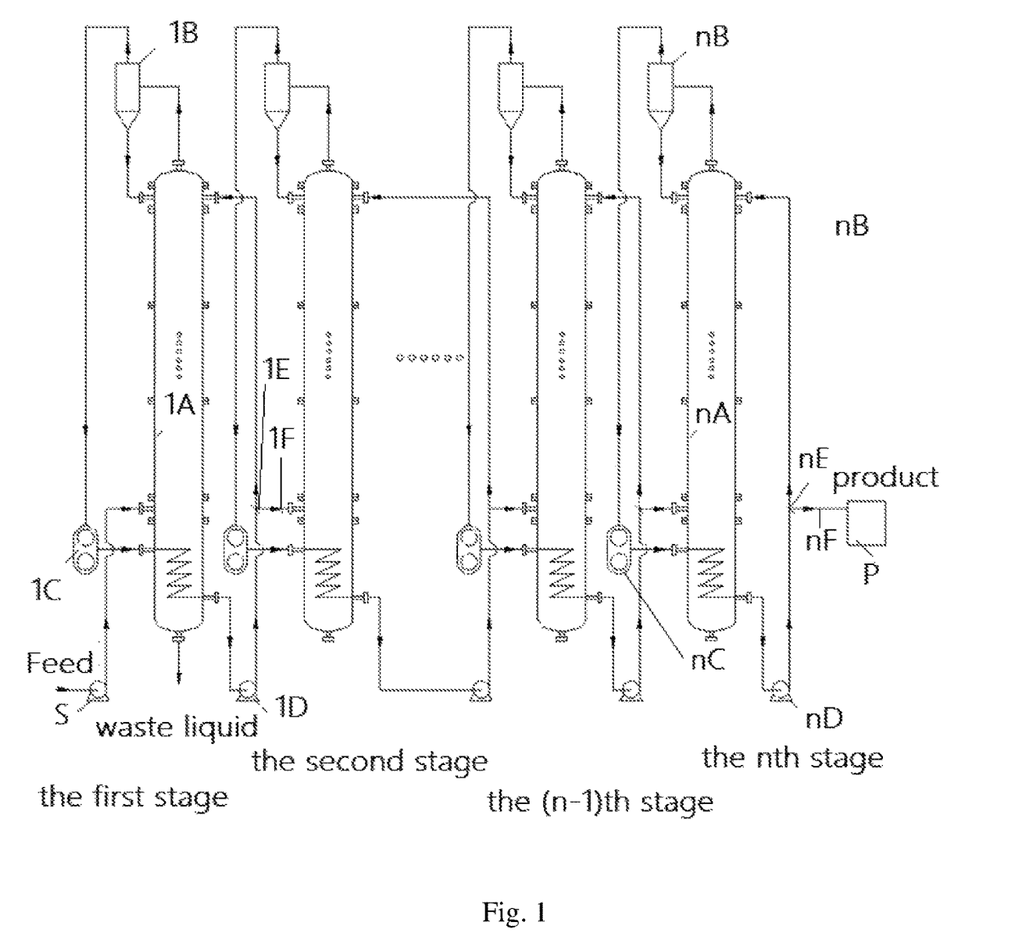
FIG. 1 is a process flow diagram of a device and method for multistage continuous preparation of deuterium depleted water according to the present invention, wherein the arrows indicate stream flow directions, and wherein the device comprises a feeding pump S, a receiving device P, and n stages of separation systems; the first-stage separation system comprising a distillation column 1A, a vapor-liquid separator 1B, a low-pressure steam compressor 1C, a stream delivery pump 1D, a three-way valve 1E, and a stream output pipe 1F; the n-stage separation system comprising a distillation column nA, a vapor-liquid separator nB, a low-pressure steam compressor nC, a stream delivery pump nD, a three-way valve nE, and a stream output pipe nF, n being a positive integer.
Figure 2:
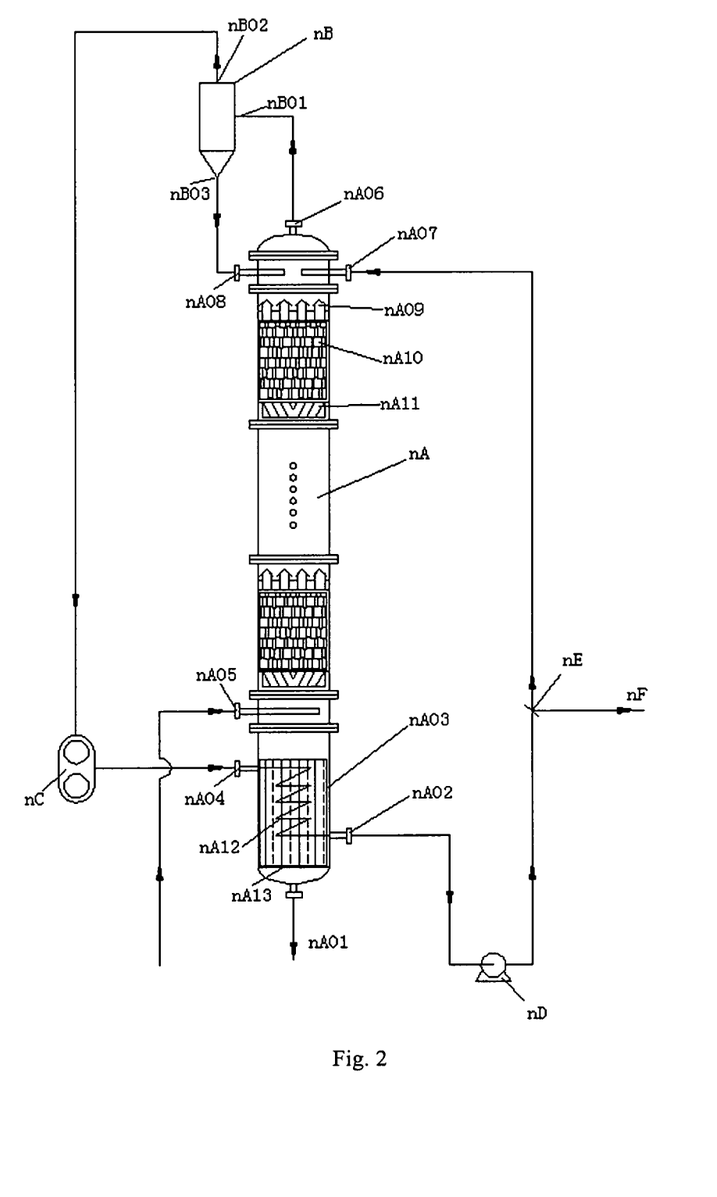
FIG. 2 is a schematic diagram of a single-stage distillation column according to the present invention, wherein the single-stage distillation column comprises a distillation column nA, a vapor-liquid separator nB, a low-pressure steam compressor nC, a stream delivery pump nD, a three-way valve nE, and a stream output pipe nF, n being a positive integer.

A device for multistage continuous preparation of deuterium depleted water comprises a feeding pump S, a plurality of stages of separation systems connected in series, and a receiver P, wherein each stage of separation system comprises a distillation column nA, a vapor-liquid separator nB, a low-pressure steam compressor nC, a stream delivery pump nD, a three-way valve nE, and a stream output pipe nF.

The distillation column nA comprises a plurality of column sections arranged vertically from top to bottom and a liquid phase vaporizer nA03 located at the bottom of the column; the distillation column nA is provided with a first liquid phase return inlet nA08, a second liquid phase return inlet nA07 and a steam outlet nA06 in the top thereof, a liquid phase inlet nA05 in the middle thereof, and a waste liquid outlet nA01 in the bottom thereof.

The liquid phase vaporizer nA03 is provided with a steam inlet nA04 in an upper part thereof and a stream outlet nA02 in a lower part thereof, the steam inlet nA04 and the stream outlet nA02 are connected through a hollow tube A12.

The vapor-liquid separator nB is provided with a vapor phase inlet nB01 in the middle thereof, a vapor phase outlet nB02 in the top thereof, and a liquid phase outlet nB03 in the bottom thereof.

The steam outlet nA06 of the distillation column nA is connected to the vapor phase inlet nB01 of the vapor-liquid separator nB, while the vapor phase outlet nB02 of the vapor-liquid separator nB is connected to an inlet of the low-pressure steam compressor nD and an outlet of the low-pressure steam compressor nD is connected to the steam inlet nA04 of the liquid phase vaporizer nA03; the liquid phase outlet nB03 of the vapor-liquid separator nB is connected to the first liquid phase return inlet nA08 of the distillation column nA.

The liquid phase stream outlet nA02 of the distillation column nA is connected to an inlet of the stream delivery pump nD, while an outlet of the stream delivery pump nD is connected to the second liquid phase return inlet nA07 of the distillation column nA and the stream output pipe nF through the three-way valve nE, respectively.

The feeding pump S is connected ahead of the liquid phase inlet nA05 of the distillation column nA in the first-stage separation system; the stream output pipe nF of the last-stage separation system is connected to the receiver P, and the stream output pipe nF of each of the other stages of separation systems is connected to the liquid phase inlet nA05 of the distillation column nA in a next-stage separation system.

All the connections are achieved by means of pipes.

The number of the separation systems is 1~10, preferably, 2~6.

The number of the column sections is 1~30, preferably, 10~25.

The column section is composed of a liquid phase collecting distributor nA09, a mass transfer stage element nA10, and a vapor phase distributor nA11.

The mass transfer stage element nA10 is a random mass transfer stage element or a structured mass transfer stage element.

Preferably, the random mass transfer stage element is a Dixon random mass transfer stage element of which a height equivalent to a theoretical plate is 1 cm to 4 cm, and the structured mass transfer stage element is a corrugated mass transfer stage element of which a height equivalent to a theoretical plate is 2 cm to 6 cm.

Preferably, the material of the mass transfer stage element is a hydrophilic material.

More preferably, the hydrophilic material is a phosphorous bronze material.

Even more preferably, the content of phosphorus in the phosphorous bronze is not lower than 0.3% in mass percent.

An electric heater nA13 is further arranged in the liquid phase vaporizer nA03. More preferably, the electric heater can be mounted at the bottom of the liquid phase vaporizer, and the electric heater can be an electric heating coil.

Preferably, the liquid phase inlet nA05 is located between the last column section and the liquid phase vaporizer nA03.

A method for preparing deuterium depleted water comprises feeding a liquid phase stream, i.e., natural water as feed, into the above device for multistage continuous preparation of deuterium depleted water and continuously or intermittently producing deuterium depleted water from the output device.

More specifically, the method includes the following steps:

(1) The natural water feed as a liquid phase stream is fed into the device for multistage continuous preparation of deuterium depleted water by the feeding pump S;

(2) in each stage of separation system, the liquid phase feed is delivered into the distillation column nA through the liquid phase inlet nA05 and vaporized under the action of the liquid phase vaporizer nA03 under an operating pressure and at an operating temperature in each stage of separation system, thereby obtaining a vapor phase stream that ascends in the distillation column nA and enters the vapor-liquid separator nB through the steam outlet nA06 for vapor-liquid separation;

(3) the liquid phase obtained in the vapor-liquid separator nB returns to the distillation column nA through the liquid phase outlet nB03 and a first liquid phase stream return inlet nA08 in sequence to be part of the liquid phase stream; the vapor phase obtained in the vapor-liquid separator nB is discharged through the vapor phase outlet nB02 and then is compressed in the low-pressure steam compressor nC, thereby obtaining steam that enters the hollow tube nA12 through the steam inlet nA04 for heat exchange with the liquid phase stream in the liquid phase vaporizer nA03; the liquid phase stream obtained after heat release and condensation is drained out of the stream outlet nA02 into the stream delivery pump nD, and then part of the liquid phase stream is returned to the distillation tower nA through the second liquid phase stream return inlet nA07 by means of the three-way valve 1E for continuous distillation, while the other part of the liquid phase stream is discharged to next-stage separation system or into the receiver through the stream output pipe nF.

Preferably, the step (3) further comprises a step in which part of the liquid phase stream in the liquid phase vaporizer nA03 is drained out of the system as waste liquid through the waste liquid outlet nA01 at the bottom of the distillation column.

The distillation column A has the following parameters: column top operating pressure 50-760 mmHg, column top temperature 38-110° C., column bottom operating pressure 200-900 mmHg, and column bottom temperature 67-110° C. The column top operating pressure is controlled by adjusting the frequency of the low-pressure steam compressor nC.

Each stage of system of the device is provided with the low-pressure steam compressor nC. The vapor phase obtained in the vapor-liquid separator nB enters and is compressed by the low-pressure steam compressor nC into high-pressure and high-temperature steam, and then the steam enters the liquid phase vaporizer for heat exchange with the liquid phase stream in the liquid phase vaporizer; thus, the liquid phase stream in the liquid phase vaporizer is vaporized, while the steam itself releases heat and is condensed into liquid. Therefore, the purposes of energy recycling and energy saving are achieved.

In the liquid phase vaporizer, the heat for heating the liquid phase stream comes from heating by the electric heater and heat exchange with the steam formed through compression by the low-pressure steam compressor. In the start-up period of the system, all the heat comes from the electric heater; in the normal operation period of the system, the heat mainly comes from heat exchange, and the heat generated from heating by the electric heater that is just sufficient to make up for the heat loss in the normal operation period of the system is needed.

In all stages of systems, the liquid phase stream continuously flows backwards stage by stage under the combined action of the low-pressure steam compressors and the stream delivery pumps. In a single-stage system, depending on the difference in vapor pressure between $^1H2O$ and $^2H2O$, the descending liquid phase and the ascending vapor phase come into continuously countercurrent contact in the mass transfer unit column section, thereby achieving partial vaporization and partial condensation. As a result, the light isotope $^1H2O$ will enter into the vapor phase because of its higher relative volatility, while the heavy isotope $^2H2O$ will enter into the liquid phase because of its lower relative volatility. The deuterium in the vapor phase may be continuously deprived and condensed by the liquid phase vaporizer at the last stage to enter the receiver. Part of the condensed heavy isotope $^2H2O$ may be drained out of the waste liquid outlet nA01 as required.

The deuterium depleted water with a deuterium content of 1 ppm to 130 ppm can be prepared by adjusting a ratio of the liquid phase returned to the distillation tower of the same stage to the liquid phase fed into the next-stage separation system in the step (3).

According to the present invention, with no condenser provided and no external steam supply brought in, the vapor phase stream in each stage of separation system is pressurized for improved heat quality by using the low-pressure steam compressor so as to supply heat for the liquid phase vaporizer to vaporize the liquid phase stream, and meanwhile, the vapor phase stream is cooled into the liquid phase stream. Then, the liquid phase stream is continuously delivered to the separation systems of the same stage and next stage for repeated related operations and condensed in the last-stage system, thereby obtaining the deuterium depleted water product. Therefore, the present invention has the advantages of simple structure, extremely low energy consumption, high separation efficiency, and the like.

The present invention can produce the following beneficial effects:

1. Only 1~10 stages of vapor-liquid mass transfer separation units are adopted for preparing products of a large scale and different qualities. The separation system recovers the heat of the vapor phase stream and delivers the vapor phase stream by using the low-pressure steam compressors, and delivers the liquid phase stream by using the stream delivery pumps, thereby achieving series continuous flowing of the streams. The separation system is provided with the liquid phase vaporizers with no cooler and no complex circulating water system and external steam supply system are needed, so that the process is simplified and 30-50% of investment is saved.

2. Each stage of mass transfer separation system is provided with no condenser and no circulating cooling water and no external steam supply are brought in. Instead, the low-pressure steam compressor is employed to recover the heat of the vapor phase stream and supply to heat the liquid phase stream. In this way, the liquefying energy of the streams are fully utilized. Only a little energy may be needed to actuate the low-pressure steam compressor and switch on electric heating in the liquid phase vaporizer to make up for the heat loss of the device and thereby 60-80% of system energy can be saved.

3. The mass transfer separation column section is composed of a liquid phase collecting distributor, a random or structured mass transfer stage element, and a vapor phase distributor. Efficient Dixon random and efficient corrugated mass transfer stage elements are easy to magnify, high in separation efficiency, and simple in process, with low liquid holdup of the system and greatly shortened equilibrium time of the isotope separation system.

DETAILED DESCRIPTION OF THE INVENTION

The present invention can be better understood according to the following examples. However, it would be easy for a person skilled in the art to understand that the contents described in the examples are merely intended to illustrate the present invention rather than limit the present invention described in detail in the claims.

Embodiment 1

Natural water containing the deuterium isotope with an abundance of 150 ppm as feed is fed into the device of the present invention. A two-stage system is connected in series. A separation column section of a distillation column in a first-stage system is provided with a corrugated structured mass transfer stage element of which the height equivalent to a theoretical plate (HETP) is 6.0 cm, and a low-pressure steam compressor, which is a 20 KW power compressor, is adjustable within a frequency range of 40 to 50 Hz. An operating pressure at the top of the first-stage distillation column is controlled to 760 mmHg (absolute pressure) and an operating temperature is controlled to 100° C. A separation column section of a distillation column in a second-stage system is provided with a corrugated structured mass transfer stage element of which the height equivalent to a theoretical plate (HETP) is 4.0 cm, and a low-pressure steam compressor, which is a 10 KW power compressor, is adjustable within a frequency range of 40 to 50 Hz. An operating pressure at the top of the second-stage distillation column is controlled to 500 mmHg (absolute pressure) and an operating temperature is controlled to 88° C.

Figure 3:
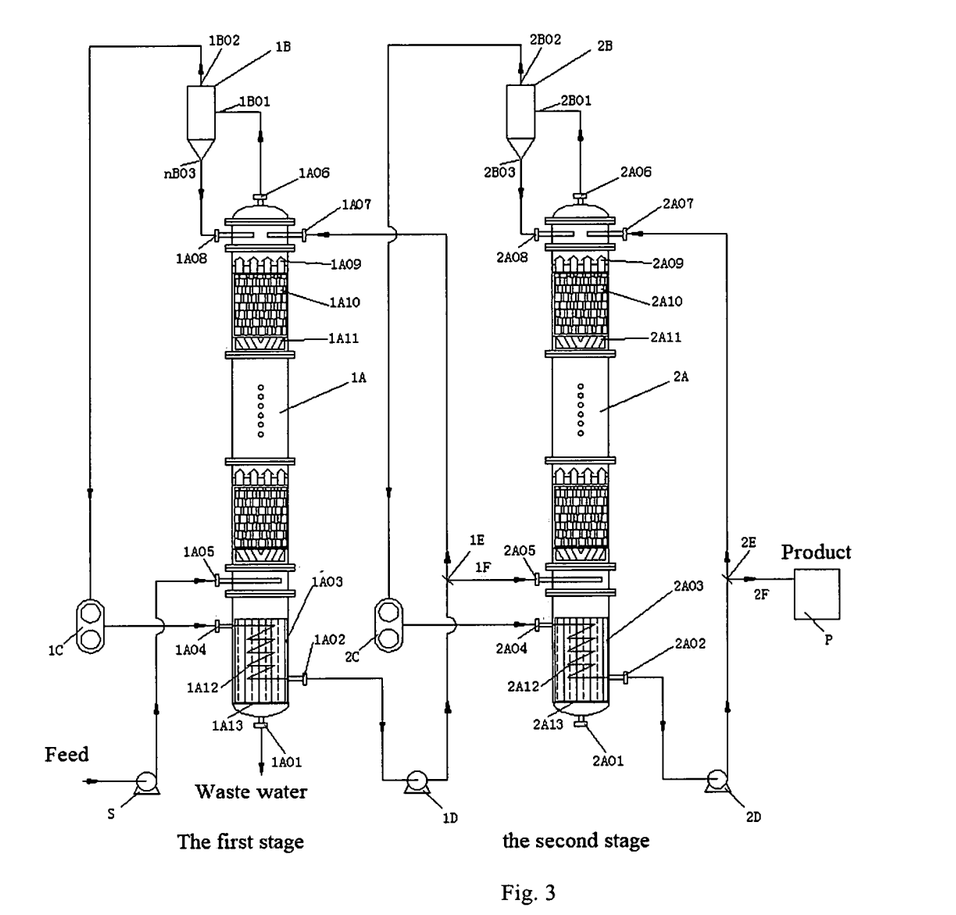
FIG. 3 is a process flow diagram of a two-stage device of embodiment 1 and 4.

The natural water feed, i.e., a liquid phase stream, is fed into a liquid phase inlet 1A05 in the middle of the first-stage distillation column 1A by a feeding pump S and flows to a liquid phase vaporizer 1A03 at the bottom, and then is heated to vaporize. Specifically, the liquid phase stream is heated to vaporize by an electric heater 1A13 arranged in the liquid phase vaporizer 1A03 in an initial heating period, and in a normal start-up period, heated to vaporize by a high-temperature and high-pressure vapor phase stream, i.e., steam, that is formed by compressing the vapor phase stream in the top using a low-pressure steam compressor 1B. The vapor phase stream ascends in the distillation column 1A and enters a vapor-liquid separator 1B through a steam outlet 1A06 for vapor-liquid separation.

The liquid phase obtained in the vapor-liquid separator 1B returns to the distillation column 1A through a liquid phase outlet 1B03 and a first liquid phase stream return inlet 1A08 in sequence to be part of the liquid phase stream. The vapor phase obtained in the vapor-liquid separator 1B enters and is compressed by a low-pressure steam compressor 1C into high-temperature and high-pressure steam, and the steam enters a hollow tube 1A12 through a steam inlet 1A04 for heat exchange with the liquid phase stream in the liquid phase vaporizer 1A03. The liquid phase stream obtained after heat release and condensation is drained out of a stream outlet 1A02 into a stream delivery pump 1D, and part of the liquid phase stream is returned to the distillation column 1A through a second liquid phase stream return inlet 1A07 by means of a three-way valve 1E for continuous distillation, while the other part of the liquid phase stream is discharged to a liquid phase inlet 2A05 of the second-stage separation system through a stream output pipe 1F and flows to a liquid phase vaporizer 2A03 at the bottom, and then is heated to vaporize. The vapor phase stream ascends in a distillation column 2A and enters a vapor-liquid separator 2B through a steam outlet 2A06 for vapor-liquid separation.

The liquid phase obtained in the vapor-liquid separator 2B returns to the distillation column 2A through a liquid phase outlet 2B03 and a first liquid phase stream return inlet 2A08 in sequence to be part of the liquid phase stream. The vapor phase obtained in the vapor-liquid separator 2B enters and is compressed by a low-pressure steam compressor 2C into high-temperature and high-pressure steam, and the steam enters a hollow tube 2A12 through a steam inlet 2A04 for heat exchange with the liquid phase stream in the liquid phase vaporizer 2A03. The liquid phase stream obtained after heat release and condensation is drained out of a stream outlet 2A02 into a stream delivery pump 2D, and part of the liquid phase stream is returned to the distillation column 2A through a second liquid phase stream return inlet 2A07 by means of a three-way valve 2E for continuous distillation, while the other part of the liquid phase stream is discharged to a receiver P through a stream output pipe 2F, thereby obtaining the deuterium depleted water product with a deuterium content of 100 ppm.

Part of the liquid phase stream in the liquid phase vaporizer nA03 is drained out of the system as waste liquid.

TABLE 1

Operating parameter table of the two-stage process device of embodiment 1

| Operating parameter | First Stage | Second Stage |
| --- | --- | --- |
| Pump | Feeding pump S: whirlpool pump 25NPD07Z; Stream delivery pump: whirlpool pump 20NPD07Z. | |
| Liquid phase feed flow | Feed to 1A05 200 Kg/h (150 ppm) | Feed to 2A05 175 Kg/h (120 ppm) |
| Liquid phase return flow | Liquid phase return through 1A07 600 Kg/h | Liquid phase return through 2A07 250 Kg/h |
| Condensed liquid phase flow | Liquid phase output through 1A02 775 Kg/h | Liquid phase output through 2A02 425 Kg/h |
| Low-pressure steam flow | Low-pressure steam flow into 1C 775 Kg/h | Low-pressure steam flow into 2C 425 Kg/h |
| Waste liquid flow | Waste liquid through 1A01 25 Kg/h (360 ppm) | Waste liquid through 2A01 5 Kg/h (800 ppm) |
| Product flow | From 2A05 to next-stage system 175 Kg/h (120 ppm) | Product 170 Kg/h (100 ppm) |
| Structural parameters of the distillation column | diameter 800 mm, height 2500 mm, number of the column sections 10. | diameter 400 mm, height 1500 mm, number of the column sections 15. |
| Operating pressure at the top of the distillation column | 760 mmHg | 500 mmHg |

TABLE 1-continued

Operating parameter table of the two-stage process device of embodiment 1

| Operating parameter | | First Stage | Second Stage |
|---|---|---|---|
| Operating temperature at the top of the distillation column | | 100° C. | 88° C. |
| Operating pressure at the bottom of the distillation column | | 900 mmHg | 650 mmHg |
| Operating temperature at the bottom of the distillation column | | 104° C. | 96° C. |
| Type of low pressure steam compressor | | Roltz steam compressor ZQRSR-200 | Roltz steam compressor ZQRSR-100 |
| Parameters of the low-pressure steam compressors | Inlet pressure | 760 mmHg | 500 mmHg |
| | Outlet pressure | 900 mmHg | 650 mmHg |
| | Power | 20 KW | 10 KW |
| | Adjustable frequency | 40-50 Hz | 40-50 Hz |
| Parameters of the liquid phase vaporizers | Heat exchange area | 1.36 m$^2$ | 0.75 m$^2$ |
| | Electric heating power | 40 KW | 20 KW |
| Parameters of the distillation columns | | Corrugated structured mass transfer stage element: Height equivalent to a theoretical plate 6.0 cm | Corrugated structured mass transfer stage element: Height equivalent to a theoretical plate 4.0 cm |
| Assumed steam vaporized liquid phase flow in use | | 775 Kg/h | 425 Kg/h |
| Required heat energy supply | | 465 KW | 255 KW |
| Electric power used in the present process | | 60 KW | 30 KW |
| System heat loss 10% taken into consideration | | 46.5 KW | 25.5 KW |
| Energy saved | | 77.1% | 78.2% |

Notes:
the heat of vaporization of water is calculated by 2200 KJ/Kg (0.6 KWh/kg).

Embodiment 2

Natural water containing the deuterium isotope with an abundance of 155 ppm as feed is fed into the device of the present invention. A three-stage system is connected in series to form a series stage. A separation column section of a distillation column in a first-stage system is provided with a corrugated structured mass transfer stage element of which the height equivalent to a theoretical plate (HETP) is 5.0 cm, and a low-pressure steam compressor, which is a 30 KW power compressor, is adjustable within a frequency range of 40 to 50 Hz. An operating pressure at the top of the first-stage distillation column is controlled to 760 mmHg (absolute pressure) and an operating temperature is controlled to 100° C. A separation column section of a distillation column in a second-stage system is provided with a corrugated structured mass transfer stage element of which the height equivalent to a theoretical plate (HETP) is 3.5 cm, and a low-pressure steam compressor, which is a 20 KW power compressor, is adjustable within a frequency range of 40 to 50 Hz. An operating pressure at the top of the second-stage distillation column is controlled to 500 mmHg (absolute pressure) and an operating temperature is controlled to 88° C. A separation column section of a distillation column in a third-stage system is provided with a corrugated structured mass transfer stage element of which the height equivalent to a theoretical plate (HETP) is 2.0 cm, and a low-pressure steam compressor, which is a 10 KW power compressor, is adjustable within a frequency range of 40 to 50 Hz. An operating pressure at the top of the second-stage distillation column is controlled to 240 mmHg (absolute pressure) and an operating temperature is controlled to 70° C.

Figure 4:
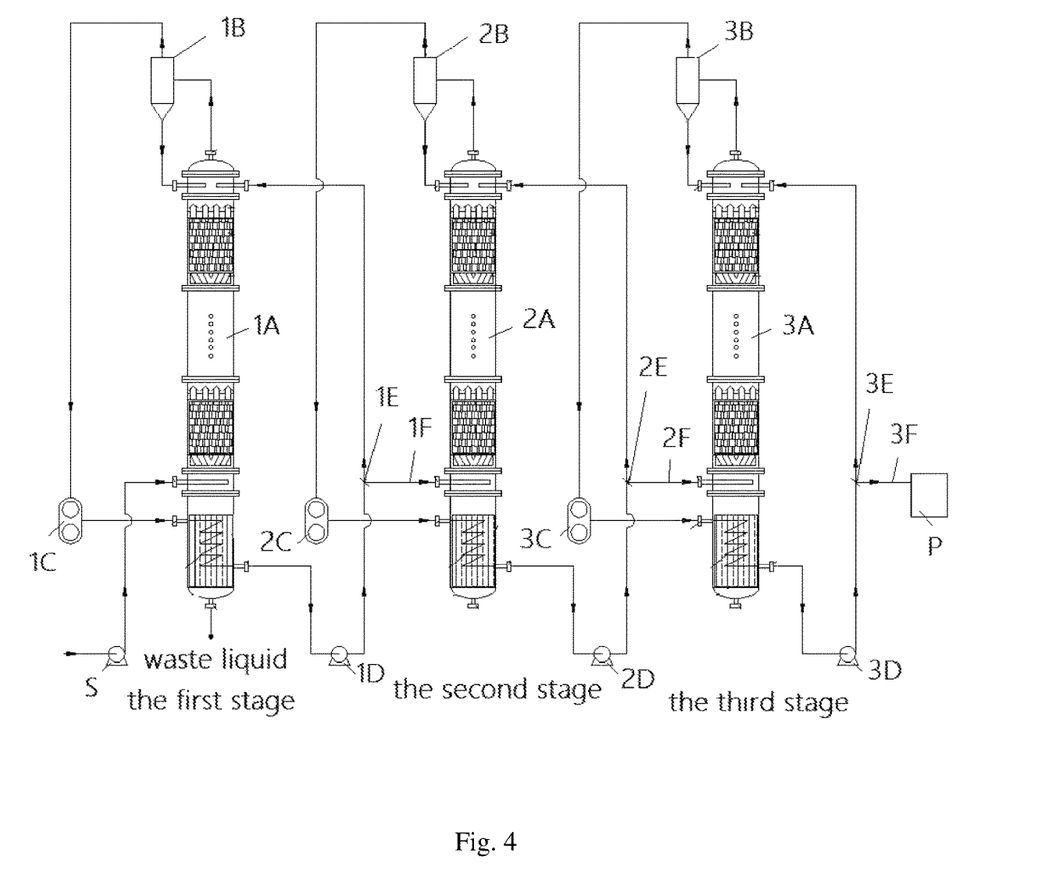
FIG. 4 is a process flow diagram of a three-stage device of embodiment 2.

A vapor phase stream ascends in the distillation column 2A and enters a vapor-liquid separator 2B through a steam outlet 2A06 for vapor-liquid separation.

The liquid phase obtained in the vapor-liquid separator 2B returns to the distillation column 2A through a liquid phase outlet 2B03 and a first liquid phase stream return inlet 2A08 in sequence to be part of the liquid phase stream. The vapor phase obtained in the vapor-liquid separator 2B enters and is compressed by a low-pressure steam compressor 2C into high-temperature and high-pressure steam, and the steam enters a hollow tube 2A12 through a steam inlet 2A04 for heat exchange with the liquid phase stream in the liquid phase vaporizer 1A03. The liquid phase stream obtained after heat release and condensation is drained out of a stream outlet 2A02 into a stream delivery pump 2D, and part of the liquid phase stream is returned to the distillation column 2A through a second liquid phase stream return inlet 2A07 by means of a three-way valve 2E for continuous distillation, while the other part of the liquid phase stream is discharged to a liquid phase inlet 3A05 of the third-stage separation system through a stream output pipe 2F and flows to a liquid phase vaporizer 3A03 at the bottom, and then is heated to vaporize. The vapor phase stream ascends in a distillation column 3A and enters a vapor-liquid separator 3B through a steam outlet 3A06 for vapor-liquid separation.

The liquid phase obtained in the vapor-liquid separator 3B returns to the distillation column 3A through a liquid phase outlet 3B03 and a first liquid phase stream return inlet 3A08 in sequence to be part of the liquid phase stream. The vapor phase obtained in the vapor-liquid separator 3B enters and is compressed by a low-pressure steam compressor 3C into high-temperature and high-pressure steam, and the steam enters a hollow tube 3A12 through a steam inlet 3A04 for heat exchange with the liquid phase stream in the liquid phase vaporizer 3A03. The liquid phase stream obtained after heat release and condensation is drained out of a stream outlet 3A02 into a stream delivery pump 3D, and part of the liquid phase stream is returned to the distillation column 3A through a second liquid phase stream return inlet 3A07 by means of a three-way valve 3E for continuous distillation, while the other part of the liquid phase stream is discharged to a receiver P through a stream output pipe 3F, thereby obtaining the deuterium depleted water product with a deuterium content of 50 ppm.

Part of the liquid phase stream in the liquid phase vaporizer nA03 is drained out of the system as waste liquid.

TABLE 2

Operating parameter table of the three-stage process device of embodiment 2

| Operating parameter | | First Stage | Second Stage | Third Stage |
|---|---|---|---|---|
| Pump | | \multicolumn{3}{c}{Feeding pump S: whirlpool pump 25NPD07Z; Stream deliver pump: whirlpool pump 25NPD07Z.} | |
| Liquid phase feed flow | | Feed to 1A05 250 Kg/h (155 ppm) | Feed to 2 A05 225 Kg/h (105.6 ppm) | Feed to 3 A05 215 Kg/h (80.3 ppm) |
| Liquid phase return flow | | Liquid phase return through 1A07 600 Kg/h | Liquid phase return through 2A07 400 Kg/h | Liquid phase return through 3A07 200 Kg/h |
| Condensed liquid phase flow | | Liquid phase output through 1A02 825 Kg/h | Liquid phase output through 2A02 615 Kg/h | Liquid phase output through 3A02 405 Kg/h |
| Low-pressure steam flow | | Low-pressure steam flow into 1C 825 Kg/h | Low-pressure steam flow into 2C 615 Kg/h | Low-pressure steam flow into 3C 405 Kg/h |
| Waste liquid flow | | Waste liquid through 1A01 25 Kg/h (600 ppm) | Waste liquid through 2A01 10 Kg/h (650 ppm) | Waste liquid through 3A01 10 Kg/h (700 ppm) |
| Product flow | | From 2A05 into next stage 225 Kg/h (105.6 ppm) | From 3A05 into next stage 215 Kg/h (80.3 ppm) | Product 205 Kg/h (50 ppm) |
| Structural parameters of the distillation column | | diameter 800 mm, height 2500 mm, number of the column sections 10. | diameter 600 mm, height 2500 mm, number of the column sections 10. | diameter 400 mm, height 1500 mm, number of the column sections 15. |
| Operating pressure at the top of the distillation column | | 760 mmHg | 500 mmHg | 240 mmHg |
| Operating temperature at the top of the distillation column | | 100° C. | 88° C. | 70° C. |
| Operating pressure at the bottom of the distillation column | | 900 mmHg | 650 mmHg | 400 mmHg |
| Operating temperature at the bottom of the distillation column | | 104° C. | 96° C. | 83° C. |
| Type of low pressure steam compressor | | Roltz steam compressor ZQRSR-300 | Roltz steam compressor ZQRSR-200 | Roltz steam compressor ZQRSR-100 |
| Parameters of the low-pressure steam compressors | Inlet pressure | 760 mmHg | 500 mmHg | 240 mmHg |
| | Outlet pressure | 900 mmHg | 650 mmHg | 400 mmHg |
| | Power | 30 KW | 20 KW | 10 KW |
| | Adjustable frequency | 40-50 Hz | 40-50 Hz | 40-50 Hz |
| Parameters of the liquid phase vaporizers | Heat exchange area | 1.49 m$^2$ | 1.09 m$^2$ | 0.71 m$^2$ |
| | Electric heating power | 50 KW | 40 KW | 30 KW |

TABLE 2-continued

Operating parameter table of the three-stage process device of embodiment 2

| Operating parameter | First Stage | Second Stage | Third Stage |
|---|---|---|---|
| Parameters of the distillation columns | Corrugated structured mass transfer stage element: Height equivalent to a theoretical plate 5.0 cm | Corrugated structured mass transfer stage element: Height equivalent to a theoretical plate 3.5 cm | Corrugated structured mass transfer stage element: Height equivalent to a theoretical plate 2.0 cm |
| Assumed steam vaporized liquid phase flow in use | 825 Kg/h | 615 Kg/h | 505 Kg/h |
| Required heat energy supply | 495 KW | 369 KW | 303 KW |
| Electric power used in the present process | 80 KW | 60 KW | 40 KW |
| System heat loss 10% taken into consideration | 49.5 KW | 36.9 KW | 30.3 KW |
| Energy saved | 73.8% | 73.7% | 76.8% |

Notes:
the heat of vaporization of water is calculated by 2200 KJ/Kg (0.6 KWh/Kg).

Embodiment 3

Natural water containing the deuterium isotope with an abundance of 145 ppm as feed is fed into the device of the present invention. A six-stage system is connected in series to form a series stage.

The system and operation parameters are shown in table 3.

Figure 5:
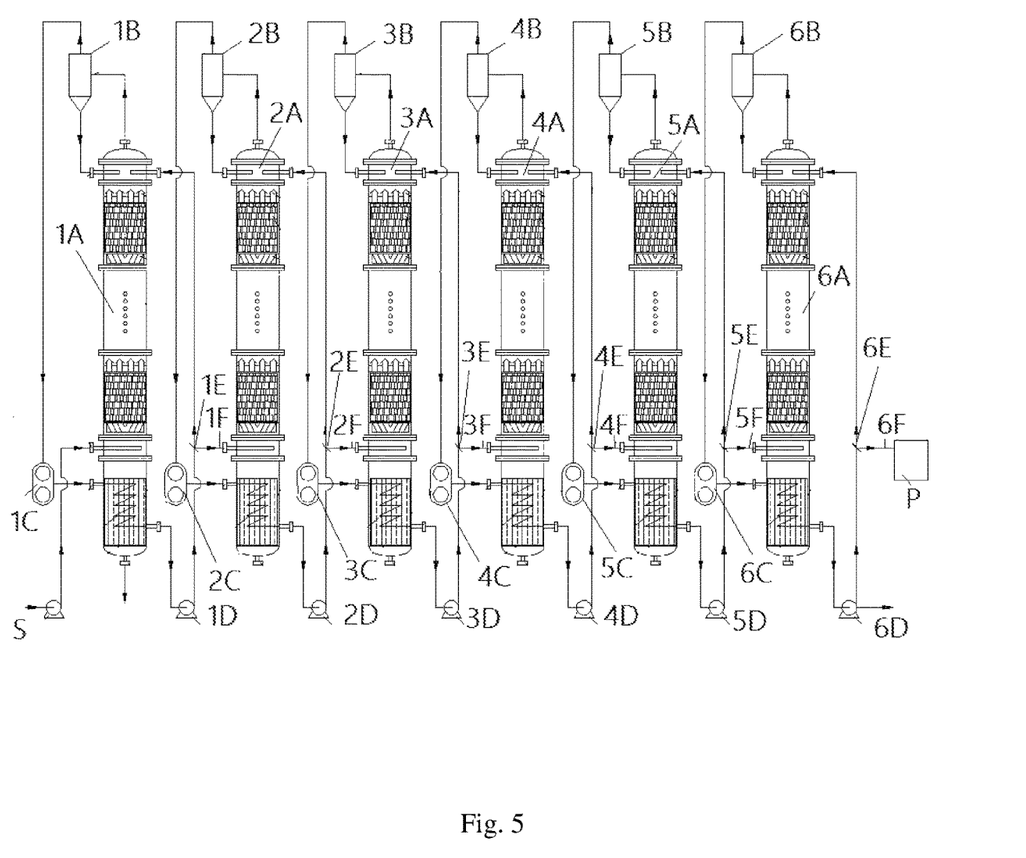
FIG. 5 is a process flow diagram of a six-stage device of embodiment 3.

The natural water feed, i.e., a liquid phase stream, is fed into a liquid phase inlet 1A05 in the middle of the first-stage distillation column 1A by a feeding pump S and flows to a liquid phase vaporizer 1A03 at the bottom, and then is heated to vaporize. Specifically, the liquid phase stream is heated to vaporize by an electric heater 1A13 arranged in the liquid phase vaporizer 1A03 in an initial heating period, and in a normal start-up period, heated to vaporize by a high-temperature and high-pressure vapor phase stream, i.e., steam, that is formed by compressing the vapor phase stream in the top using a low-pressure steam compressor 1B. The vapor phase stream ascends in the distillation column 1A and enters a vapor-liquid separator 1B through a steam outlet 1A06 for vapor-liquid separation.

The liquid phase obtained in the vapor-liquid separator 1B returns to the distillation column 1A through a liquid phase outlet 1B03 and a first liquid phase stream return inlet 1A08 in sequence to be part of the liquid phase stream. The vapor phase obtained in the vapor-liquid separator 1B enters and is compressed by a low-pressure steam compressor 1C into high-temperature and high-pressure steam, and the steam enters a hollow tube 1A12 through a steam inlet 1A04 for heat exchange with the liquid phase stream in the liquid phase vaporizer 1A03. The liquid phase stream obtained after heat release and condensation is drained out of a stream outlet 1A02 into a stream delivery pump 1D, and part of the liquid phase stream is returned to the distillation column 1A through a second liquid phase stream return 1A07 by means of a three-way valve 1E for continuous distillation, while the other part of the liquid phase stream is discharged to a liquid phase inlet 2A05 of the second-stage separation system through a stream output pipe 1F.

Following the same path and in the same manner, the liquid phase stream continuously passes through the second stage, the third stage, the four stage, the fifth stage and the fifth stage that are connected in series. After six times of deprivation of the deuterium, part of the liquid phase stream from the vapor phase stream after heat release and condensation is delivered to a liquid phase return inlet 6A07 in the top of the sixth stage, while the rest is discharged to a receiver P through a stream output pipe 6F, thereby obtaining the deuterium depleted water product with a deuterium content of 1 ppm.

Part of the liquid phase stream in the liquid phase vaporizer nA03 is drained out of the system as waste liquid.

TABLE 3

Operating parameter table of the six-stage process device of embodiment 3

| | Operating Parameter | | | | | |
|---|---|---|---|---|---|---|
| | First Stage | Second Stage | Third Stage | Fourth Stage | Fifth Stage | Sixth Stage |
| Pump | Feeding pump S, Stream delivery pump 2D and 3D: whirlpool pump 25NPD07Z; Stream delivery pump 4D~6D: whirlpool pump 20NPD07Z | | | | | |
| Liquid Phase feed flow | Feed to 1A05 250 Kg/h (145 ppm) | Feed to 2A05 225 Kg/h (133.3 ppm) | Feed to 3A05 200 Kg/h (117.5 ppm) | Feed to 4A05 175 Kg/h (95.7 ppm) | Feed to 5A05 150 Kg/h (65 ppm) | Feed to 6A05 140 Kg/h (41.1 ppm) |
| Liquid phase return flow | Liquid phase return through 1A07 600 Kg/h | Liquid phase return through 2A07 400 Kg/h | Liquid phase return through 3A07 400 Kg/h | Liquid phase return through 4A07 300 Kg/h | Liquid phase return through 5A07 200 Kg/h | Liquid phase return through 6A07 200 Kg/h |

TABLE 3-continued

Operating parameter table of the six-stage process device of embodiment 3

| | | Operating Parameter | | | | | |
|---|---|---|---|---|---|---|---|
| | | First Stage | Second Stage | Third Stage | Fourth Stage | Fifth Stage | Sixth Stage |
| Pump | | Feeding pump S, Stream delivery pump 2D and 3D: whirlpool pump 25NPD07Z; Stream delivery pump 4D~6D: whirlpool pump 20NPD07Z | | | | | |
| Condensed liquid phase flow | | Liquid phase output through 1A02 825 Kg/h | Liquid phase output through 2A02 600 Kg/h | Liquid phase output through 3A02 575 Kg/h | Liquid phase output through 4A02 450 Kg/h | Liquid phase output through 5A02 340 Kg/h | Liquid phase output through 6A02 330 Kg/h |
| Low-pressure steam flow | | Low-pressure steam flow into 1C 825 Kg/h | Low-pressure steam flow into 2C 600 Kg/h | Low-pressure steam flow into 3C 575 Kg/h | Low-pressure steam flow into 4C 400 Kg/h | Low-pressure steam flow into 5C 340 Kg/h | Low-pressure steam flow into 6C 330 Kg/h |
| Waste liquid flow | | Waste liquid through 1A01 25 Kg/h (250 ppm) | Waste liquid through 2A01 25 Kg/h (260 ppm) | Waste liquid through 3A01 25 Kg/h (270 ppm) | Waste liquid through 4A01 25 Kg/h (280 ppm) | Waste liquid through 5A01 10 Kg/h (400 ppm) | Waste liquid through 6A01 10 Kg/h (562 ppm) |
| Product flow | | From 2A05 to next stage 225 Kg/h (133.3 ppm) | From 3A05 to next stage 200 Kg/h (117.5 ppm) | From 4A05 to next stage 175 Kg/h (95.7 ppm) | From 5A05 to next stage 150 Kg/h (65 ppm) | From 6A05 to next stage 140 Kg/h (41.1 ppm) | Product 130 Kg/h (1 ppm) |
| Structural parameters of the distillation column | | diameter 800 mm, height 2500 mm, number of the column sections 10. | diameter 600 mm, height 2500 mm, number of the column sections 10. | diameter 600 mm, height 2500 mm, number of the column sections 10. | diameter 400 mm, height 1500 mm, number of the column sections 15. | diameter 400 mm, height 1500 mm, number of the column sections 15. | diameter 200 mm, height 1500 mm, number of the column sections 25. |
| Operating pressure at the top of the distillation column | | 760 mmHg | 500 mmHg | 240 mmHg | 240 mmHg | 100 mmHg | 80 mmHg |
| Operating temperature at the top of the distillation column | | 100° C. | 88° C. | 70° C. | 70° C. | 51° C. | 47° C. |
| Operating pressure at the bottom of the distillation column | | 900 mmHg | 650 mmHg | 400 mmHg | 500 mmHg | 200 mmHg | 240 mmHg |
| Operating temperature at the bottom of the distillation column | | 104° C. | 96° C. | 83° C. | 88° C. | 67° C. | 70° C. |
| Type of low pressure steam compressor | | Roltz steam compressor ZQRSR-300 | Roltz steam compressor ZQRSR-200 | Roltz steam compressor ZQRSR-100 | Roltz steam compressor ZQRSR-100 | Roltz steam compressor ZQRSR-50 | Roltz steam compressor ZQRSR-50 |
| Parameters of the low-pressure steam compressors | Inlet pressure | 760 mmHg | 500 mmHg | 240 mmHg | 240 mmHg | 100 mmHg | 80 mmHg |
| | Outlet pressure | 900 mmHg | 650 mmHg | 400 mmHg | 500 mmHg | 200 mmHg | 200 mmHg |
| | Power | 30 KW | 20 KW | 10 KW | 10 KW | 5 KW | 5 KW |
| | Adjustable frequency | 40-50 Hz | 40-50 Hz | 40-50 Hz | 40-50 Hz | 40-50 Hz | 40-50 Hz |
| Parameters of the liquid phase vaporizers | Heat exchange area | 1.45 m$^2$ | 1.05 m$^2$ | 1.01 m$^2$ | 0.79 m$^2$ | 0.60 m$^2$ | 0.59 m$^2$ |
| | Electric heating power | 50 KW | 40 KW | 30 KW | 30 KW | 20 KW | 20 KW |
| Parameters of the distillation columns | | Corrugated structured mass | Corrugated structured mass | Corrugated structured mass | Dixon random mass | Dixon random mass | Dixon random mass |

TABLE 3-continued

Operating parameter table of the six-stage process device of embodiment 3

| | Operating Parameter | | | | | |
|---|---|---|---|---|---|---|
| | First Stage | Second Stage | Third Stage | Fourth Stage | Fifth Stage | Sixth Stage |
| Pump | Feeding pump S, Stream delivery pump 2D and 3D: whirlpool pump 25NPD07Z; Stream delivery pump 4D~6D: whirlpool pump 20NPD07Z | | | | | |
| | transfer stage element: Height equivalent to a theoretical plate 6.0 cm | transfer stage element: Height equivalent to a theoretical plate 4.5 cm | transfer stage element: Height equivalent to a theoretical plate 3.0 cm | transfer stage element: Height equivalent to a theoretical plate 3.0 cm | transfer stage element: Height equivalent to a theoretical plate 2.0 cm | transfer stage element: Height equivalent to a theoretical plate 1.0 cm |
| Assumed steam vaporized liquid phase flow in use | 825 Kg/h | 600 Kg/h | 575 Kg/h | 450 Kg/h | 340 Kg/h | 330 Kg/h |
| Required heat energy supply | 495 KW | 360 KW | 345 KW | 270 KW | 204 KW | 198 KW |
| Electric power used in the present process | 80 KW | 70 KW | 40 KW | 40 KW | 25 KW | 25 KW |
| System heat loss 10% taken into consideration | 49.5 KW | 36.0 KW | 34.5 KW | 27 KW | 20.4 KW | 19.8 KW |
| Energy saved | 73.8% | 70.6% | 78.4% | 75.2% | 77.7% | 77.4% |

Notes:
the heat of vaporization of water is calculated by 2200 KJ/Kg (0.6 KWh/Kg).

Embodiment 4

Natural water containing the deuterium isotope with an abundance of 150 ppm as feed is fed into the device of the present invention. A two-stage system is connected in series.

The system and operation parameters are shown in table 4.

The flow direction of the stream is the same as that in embodiment 1, and the deuterium depleted water product with a deuterium content of 95 ppm is obtained.

Part of the liquid phase stream in the liquid phase vaporizer nA03 is drained out of the system as waste liquid.

TABLE 4

Operating parameter table of the two-stage process device of embodiment 4

| Operating Parameter | First Stage | Second Stage |
|---|---|---|
| Pump | Feeding pump S: whirlpool pump 25NPD07Z; Stream delivery pump: whirlpool pump 20NPD07Z. | |
| Liquid phase feed flow | Feed to 1A05 200 Kg/h (150 ppm) | Feed to 2A05 175 Kg/h (128.6 ppm) |
| Liquid phase return flow | Liquid phase return through 1A07 600 Kg/h | Liquid phase return through 2A07 250 Kg/h |
| Condensed liquid phase flow | Liquid phase output through 1A02 775 Kg/h | Liquid phase output through 2A02 400 Kg/h |
| Low-pressure steam flow | Low-pressure steam flow into 1C 775 Kg/h | Low-pressure steam flow into 2C 400 Kg/h |
| Waste liquid flow | Waste liquid through 1A01 25 Kg/h (300 ppm) | Waste liquid through 2A01 25 Kg/h (330 ppm) |
| Product flow | From 2A05 to next stage 175 Kg/h (128.6 ppm) | Product 150 Kg/h (95 ppm) |
| Structural parameters of the distillation column | diameter 800 mm, height 2500 mm, number of the column sections 10. | diameter 400 mm, height 1500 mm, number of the column sections 15. |
| Operating pressure at the top of the distillation column | 100 mmHg | 760 mmHg |

TABLE 4-continued

Operating parameter table of the two-stage process device of embodiment 4

| Operating Parameter | | First Stage | Second Stage |
|---|---|---|---|
| Operating temperature at the top of the distillation column | | 51° C. | 100° C. |
| Operating pressure at the bottom of the distillation column | | 200 mmHg | 900 mmHg |
| Operating temperature at the bottom of the distillation column | | 67° C. | 107° C. |
| Type of low pressure steam compressor | | Roltz steam compressor ZQRSR-200 | Roltz steam compressor ZQRSR-100 |
| Parameters of the low-pressure steam compressors | Inlet pressure | 100 mmHg | 760 mmHg |
| | Outlet pressure | 200 mmHg | 900 mmHg |
| | Power | 20 KW | 10 KW |
| | Adjustable frequency | 40-50 Hz | 40-50 Hz |
| Parameters of the liquid phase vaporizers | Heat exchange area | 1.36 m$^2$ | 0.75 m$^2$ |
| | Electric heating power | 40 KW | 20 KW |
| Parameters of the distillation columns | | Corrugated structured mass transfer stage element: Height equivalent to a theoretical plate 6.0 cm | Dixon random mass transfer stage element: Height equivalent to a theoretical plate 4.0 cm |
| Assumed steam vaporized liquid phase flow in use | | 775 Kg/h | 425 Kg/h |
| Required heat energy supply | | 465 KW | 255 KW |
| Electric power used in the present process | | 60 KW | 30 KW |
| System heat loss 10% taken into consideration | | 46.5 KW | 25.5 KW |
| Energy saved | | 77.1% | 78.2% |

Notes:
the heat of vaporization of water is calculated by 2200 KJ/Kg (0.6 KWh/Kg).

The present invention is not limited to the above implementations. Any other alteration, replacement, combination and simplification made without departing from the spirit and the principles of the present invention shall be deemed to be equivalent substitutions and should be encompassed into the scope of protection of the present invention.

What is claimed is:

1. A device for multistage continuous preparation of deuterium depleted water, comprising a feeding pump, a plurality of stages of separation systems connected in series, and a receiver, wherein each stage of separation systems comprises a distillation column, a vapor-liquid separator, a low-pressure steam compressor, a stream delivery pump, a three-way valve, and a stream output pipe; wherein:

the distillation column comprises a plurality of column sections arranged vertically from top to bottom, and a liquid phase vaporizer located at the bottom of the column; the distillation column is provided with a first liquid phase return inlet, a second liquid phase return inlet and a steam outlet at the top of the column, a liquid phase inlet at the middle of the column, and a waste liquid outlet at the bottom of the column;

the liquid phase vaporizer is provided with a steam inlet in an upper part thereof and a stream outlet in a lower part thereof, the steam inlet and the stream outlet are connected through a hollow tube;

the stream delivery pump has a stream inlet and a stream outlet;

the three-way valve has three ports;

the vapor-liquid separator is provided with a vapor phase inlet in the middle thereof, a vapor phase outlet in the top thereof, and a liquid phase outlet in the bottom thereof;

the steam outlet of the distillation column is connected to the vapor phase inlet of the vapor-liquid separator, while the vapor phase outlet of the vapor-liquid separator is connected to an inlet of the low-pressure steam compressor and an outlet of the low-pressure steam compressor is connected to the steam inlet of the liquid phase vaporizer; the liquid phase outlet of the vapor-liquid separator is connected to the first liquid phase return inlet of the distillation column;

the stream outlet of the liquid phase vaporizer of the distillation column is connected to the stream inlet of the stream delivery pump, and the three ports of the three-way valve are respectively connected to the stream outlet of the stream delivery pump, the second liquid phase return inlet of the distillation column and the stream output pipe;

the feeding pump is connected ahead of the liquid phase inlet of the distillation column in a first-stage separation system; the stream output pipe of a last-stage separation system is connected to the receiver, and the stream output pipe of each of the other stages of separation systems is connected to the liquid phase inlet of the distillation column in a next-stage separation system; and all the connections are achieved by means of pipes.

2. The device for multistage continuous preparation of deuterium depleted water according to claim 1, wherein the number of the separation systems is 1~10.

3. The device for multistage continuous preparation of deuterium depleted water according to claim 1, wherein the number of the column sections is 1~30.

4. The device for multistage continuous preparation of deuterium depleted water according to claim 3, wherein the column section is composed of a liquid phase collecting distributor, a mass transfer stage element, and a vapor phase distributor.

5. The device for multistage continuous preparation of deuterium depleted water according to claim 4, wherein the mass transfer stage element is a random mass transfer stage element or a structured mass transfer stage element.

6. The device for multistage continuous preparation of deuterium depleted water according to claim 5, wherein the random mass transfer stage element is a Dixon random mass transfer stage element of which a height equivalent to a theoretical plate is 1 cm to 4 cm, and the structured mass transfer stage element is a corrugated mass transfer stage element of which a height equivalent to a theoretical plate is 2 cm to 6 cm.

7. The device for multistage continuous preparation of deuterium depleted water according to claim 6, wherein the material of the mass transfer stage element is hydrophilic material.

8. The device for multistage continuous preparation of deuterium depleted water according to claim 7, wherein the hydrophilic material is a phosphorous bronze material.

9. The device for multistage continuous preparation of deuterium depleted water according to claim 1, wherein an electric heater is further arranged in the liquid phase vaporizer.

10. The device for multistage continuous preparation of deuterium depleted water according to claim 1, wherein the liquid phase inlet is located between the last column section and the liquid phase vaporizer.

* * * * *